United States Patent [19]

Gunesin et al.

[11] Patent Number: 4,749,763

[45] Date of Patent: Jun. 7, 1988

[54] CRYSTALLINE ISOTACTIC POLY(PARA-METHYLSTYRENE)

[75] Inventors: Binnur Z. Gunesin, New York, N.Y.; James G. Murray, East Brunswick, N.J.

[73] Assignee: Mobil Oil Corporation, New York, N.Y.

[21] Appl. No.: 785,193

[22] Filed: Oct. 7, 1985

[51] Int. Cl.$^4$ ............................................. C08F 12/12
[52] U.S. Cl. .................................................. 526/347.1
[58] Field of Search ............................. 526/347, 347.1

[56] References Cited

U.S. PATENT DOCUMENTS 3,014,887 12/1961 Haward .
4,230,836 10/1980 Canterino ..................... 526/347.1
4,306,049 12/1981 Prapas .......................... 526/347.1

OTHER PUBLICATIONS

Natta et al, Makromol Chemie 28,253 (1958) reprinted in Natta and Danusso, "Stereoregular Polymers, and Stereospecific Polymerizations", Pergammon Press Ltd., London, 1967, vol. 2, p. 570.

Primary Examiner—Paul R. Michl
Attorney, Agent, or Firm—Alexander J. McKillop; Michael G. Gilman; Charles J. Speciale

[57] ABSTRACT

Crystalline isotactic poly(para-methylstyrene) previously unreported in the literature is prepared by polymerizing para-methylstyrene with a TiCl$_3$/aluminum alkyl catalyst and fractionating the product to obtain a crystalline fraction with a crystalline melting point of 205° C.

7 Claims, No Drawings

CRYSTALLINE ISOTACTIC POLY(PARA-METHYLSTYRENE)

BACKGROUND OF THE INVENTION

A variety of isotactic crystallizable polymers of vinyl aromatic polymers such as styrene and certain substituted styrenes are known. Sterospecific polymerization with Ziegler catalysts, for example, has been used successfully to prepare isotactic crystallizable polymers from styrene and many members of the styrene family as described in Natta et al, Makromol. Chemie 28,253 (1958) reprinted in Natta and Danusso, "Stereoregular Polymers, and Stereospecific Polymerizations", Pergammon Press Ltd., London, 1967, Volume 2, p. 570. However, Natta et al report that p-fluourostyrene is the only mono-para-substituted styrene they were able to polymerize to a crystalline isotactic polymer. In contrast they found the ortho- and meta-isomers readily gave methylstyrene polymers which were crystallizable. Nor have we found crystalline isotactic poly(para-methylstyrene) reported elsewhere in the literature.

BRIEF DESCRIPTION OF THE INVENTION

Crystalline isotactic poly(para-methylstyrene) has been obtained by polymerization of a high purity para-methylstyrene isomer (99%+) with a Ziegler catalyst and fractionation of the product. The first fraction was a high molecular weight polymer having 40% crystallinity and a crystalline melting point of 205° C.

DETAILED DESCRIPTION OF THE INVENTION

Para-methylstyrene can be prepared by the dehydrogenation of para-ethyltoluene. Suitable methods and catalysts are generally known. The catalyst and method disclosed U.S. Pat. No. 4,496,662 which is incorporated herein by reference, can be used.

Para-ethyltoluene having a suitably high content of the para-isomer can be prepared in accordance with U.S. Pat. Nos. 4,086,287, 4,117,024 and 4,447,666 which are incorporated herein by reference.

Polymerization of para-methylstyrene can be conducted with a catalyst which gives a steroregular product. In general, catalysts which polymerize propylene to steroregular polypropylene are suitable. For example, Ziegler catalysts, particularly those prepared from $TiCl_3$ and organoaluminum compounds can be used.

If necessary, the polymerized poly(para-methylstyrene) product can be fractionated in a suitable solvent to derive a crystallizable isotactic fraction. Mixtures of toluene and isopropanol have been found to be suitable solvent systems for fractionation, generally in a toluene:isopropanol weight ratio of 5:1 to 1.5:1 by volume.

The crystallizable poly(para-methylstyrene) of this invention can be used in the manner which the corresponding polystyrene polymers are used. For example, the polymers of this invention can be used in films and similar articles particularly where a high crystalline melting point is desirable.

The invention is illustrated by the following non-limiting example in which all parts are by weight unless otherwise indicated.

EXAMPLE

Para-methylstyrene (PMS) having a para isomer content of greater than 99% was used as monomer. All glassware had been cleaned and dried in a 120° C. oven over the weekend. Toluene was dried over molecular sieves under nitrogen over the weekend.

All glassware and reactants were placed in a nitrogen dry box and 150 ml of dry toluene added to 4 oz. bottles. Then 5.7 ml of triethyl aluminum solution was added followed by 0.90 g of $TiCl_3AA$ (aluminum activated $TiCl_3$). After mixing, 15.0 g of PMS was added. The bottles were capped with a rubber septum and placed in a 60° C. water bath, stirred overnight, and cooled to room temperature. The polymerization product was precipitated into 2 liters of isopropanol, filtered and dried at 60° C. in vacuum. The polymer was re-precipitated from toluene/isopropanol (5/1 by volume) solution. The polymer was then fractionated into 3 fractions by isopropanol/toluene solvent. The original polymer, reprecipitated polymer and the fractionated polymer samples were analyzed for melting point. The first fraction which is high molecular weight polymer had a melting point at 205° C. This polymer had 40% crystallinity.

Although the present invention has been described with a preferred embodiment it is to be understood that modifications and variations may be restored to, without departing from the spirit and scope of this invention, as those skilled in the art will readily understand. Such variations and modifications are considered to be within the scope of the following claims.

We claim:

1. Crystalline isotactic poly(para-methylstyrene).
2. Crystalline isotactic poly(para-methylstyrene) having a crystallinity of at least 20%.
3. The crystalline isotactic poly(para-methylstyrene) of claim 2 having a crystallinity of at least 30%.
4. The crystalline isotactic poly(para-methylstyrene) of claim 2 having a crystallinity of about 40%.
5. The crystalline isotactic poly(para-methylstyrene) of claim 2 having a crystalline melting point of about 205° C.
6. A film of the poly(para-methylstyrene) of claim 1.
7. A film of the poly(para-methylstyrene) of claim 2.

* * * * *